United States Patent Office 3,261,873
Patented July 19, 1966

3,261,873
SUBSTITUTED 2-HALO-4-AMINOIMIDAZOLES
AND PREPARATORY PROCESS
Francis Johnson, Newton Lower Falls, and Wilmonte A. Nasutavicus, Framingham, Mass., assignors to The Dow Chemical Company, Midland, Mich., a corporation of Delaware
No Drawing. Filed Sept. 26, 1962, Ser. No. 226,469
17 Claims. (Cl. 260—309)

This invention relates to novel substituted 4-aminoimidazoles; to the process used in the preparation of these 4-aminoimidazoles; and to an improved process for preparing N-cyano-glycinonitriles.

It is an object of this invention to provide novel substituted 4-aminoimidazoles. It is another object of this invention to provide novel processes for preparing substituted 4-aminoimidazoles. The invention also contemplates providing a novel process for preparing N-cyano-glycinonitriles. It is still another object of this invention to provide novel aryl substituted N-cyano-glycinonitriles. Other objects and advantages of the invention will in part be obvious and in part appear hereinafter.

We discovered that when N-cyano-glycinonitriles are treated with anhydrous hydrogen halides, they are cyclized to form the hydrohalide salts of 2-halo-4-aminoimidazoles, as illustrated in Equation 1. The product obtained from the reaction of Equation 1 may be acylated to obtain substituted 2-halo-4-aminoimidazoles, as illustrated in Equation 2. The amine hydrohalide salt product of Equation 1 may also be converted to the free amine by reacting it with a suitable hydrogen halide acceptor such as sodium carbonate, bicarbonate or sodium acetate.

EQUATION 1

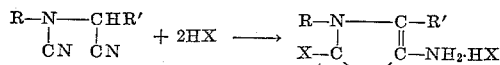

EQUATION 2

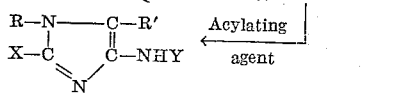

In the equations, R and R' may each be hydrogen or an aliphatic, cycloaliphatic or aryl group. They are preferably hydrogen, a lower alkyl group, a monocyclic cycloalkyl group, or a monocyclic aryl group. The anhydride acylating reactant is selected from aliphatic and aromatic acid anhydrides or the equivalent organic acid halides, e.g. acetyl chloride, chloroacetyl chloride, benzoyl chloride, etc. Y in the equations, is preferably a lower alkanoyl of two to four carbon atoms, or benzoyl. The hydrocarbon portions of the reactant N-cyano-glycinonitriles, and the reactant acylating agents may contain substituting groups or radicals which do not react with reactants or other material present in the reaction mixture. Illustrative of such substituents are the Cl−, F−, NO₂−, SO₃−, methoxy, and phenyl groups. In the equations X is selected from chlorine, bromine, and iodine. Illustrative of R and R' are butyl, octyl, cyclohexyl, cyclopentyl, phenyl, butyl, tolyl, xylyl, nitrophenyl, etc.

The cyclization reaction occurs at temperatures between about −100° C. to about 150° C. Ambient temperatures, e.g., from about 0° C. to about 50° C. are preferred. Higher temperatures may cause some decomposition and a lowering of the yield, higher temperatures also limit the choice of solvent; with a low boiling solvent superatmospheric pressure is required. The ratio of the anhydrous hydrogen halide to the glycinonitrile reactant should be at least 2:1. We prefer to use an excess of the hydrogen halide to insure complete and rapid reaction. Hydrogen bromide, hydrogen chloride, hydrogen iodide may be used. The reaction solvent should be inert to the reactant and reaction products; it should be non-polar. Illustrative of such solvents are acetic acid, ethers such as ethyl and butyl ethers, nitromethane, carbon-tetrachloride, benzene, methylene chloride, methylene dichloride, chloroform, etc. The preferred solvents are ethers and methylene chloride.

The acylation reaction is carried out at temperatures of between about 0° C. and 100° C., and preferably at ambient temperatures. The reaction takes place in a non-aqueous, non-polar solvent of the general type used in the cyclization reaction. Preferred solvents include benzene, methylene chloride, ethers such as diethyl ether and tetrahydrofuran. We prefer to include a base such as pyridine or triethylamine in the reaction mixture. Illustrative of the useful acylation reactants herein are: salicylic anhydride, propionic anhydride, benzoic anhydride, chloroacetic anhydride, acetyl chloride, benzoyl chloride, p-nitrobenzoyl chloride, p-acetaminobenzoyl chloride, pivalyl chloride and cyclohexane carbonyl chloride. Preferred acylation reactants are acetic anhydride, acetyl chloride, and benzoyl chloride.

The 4-aminoimidazoles are prepared from the 2-halo-4-aminoimidazoles by dehalogenation of the 2-halo substituent in an inert solvent with hydrogen in the presence of a hydrogenation catalyst such as platinum, palladium, or nickel. The reaction mixture should preferably also contain a hydrogen halide acceptor such as sodium acetate or calcium carbonate. We prefer to dehalogenate by preparing a solution of the 2-halo-4-aminoimidazole in ethanol and hydrogenating in the presence of a palladium on charcoal catalyst.

We also discovered that N-cyano-glycinonitriles may be advantageously prepared by reacting a cyanamide with an alkyl cyanide having a reactive alpha substituent in the presence of a suitable base according to the equation:

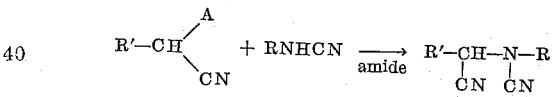

wherein R and R' are radicals as previously defined and A is a halogen or the residue of an organic carboxylic or sulfonic acid having one of the formulas

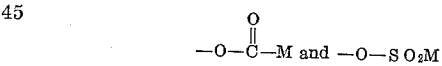

M being a hydrocarbon radical. The reaction is preferably carried out in an amide solvent such as formamide, dimethylformamide, dimethylacetamide, and N-formylmorpholine. Preferably the temperature is held between about 0° C. and 50° C. Bases such as pyridine, triethylamine and sodium acetate may be used in place of the preferred amide solvents. These N-cyano-glycinonitriles may also be prepared by a process described by De Benneville, U.S. 2,743,291, which involves the reaction of cyanogen chloride with aminonitriles.

For the purpose of further explaining the invention to those skilled in the art, the following illustrative examples are given:

Example 1

At approximately room temperature, 3.25 g. of chloroacetonitrile was added to a solution of 5.9 g. of phenylcyanamide and 5.1 g. of triethylamine in 25 ml. of dimethylformamide. The reaction mixture was stirred for 6 hours and triethylamine hydrochloride gradually precipitated from the solution. Ice water was then added to the reaction mixture, whereupon the triethylamine hydrochloride was dissolved and the desired N-cyano-N-phenylglycinonitrile was precipitated as a crystalline solid, yield 4.7 g., melting point (purified) 79–81° C.

Example 2

A solution of 1.6 g. of N-cyano-N-phenylglycinonitrile in methylene chloride was cooled to ice temperature and anhydrous hydrogen bromide was bubbled through the cold solution for one-half hour, a milky white percipitate being formed. The solvent and excess hydrogen bromide were then removed from the reaction mixture under reduced pressure and to the residual salt there was added excess pyridine and acetic anhydride. After this mixture had been stirred for about one-half hour, 20% aqueous sodium acetate was added, dropwise at first and finally in large excess. The aqueous layer thereby formed was extracted once with ether and once with ethyl acetate, these extracts were combined with the organic layer, and the whole was dried over anhydrous sodium sulfate, filtered, and the low-boiling constituents were removed under reduced pressure. The addition of a little ether caused crysallization of the resultant syrup. The yield of crude 4-acetamido-2-bromo-1-phenylimidazole was 1.2 g. or 43% of the theoretical based on the startiing material used; melting point (recrystallized) 200–202° C.

Example 3

N-butyl-N-cyanoglycinonitrile was prepared according to procedure of von Braun [v. Brann, Ber. 40, 3940 (1907)]. Anhydrous HBr was bubbled through 30 ml. of a cooled ether solution of 1.2 g. of the product glycinonitrile for 2 hours. A white solid precipitated initially but later dissolved and the reaction mixture was a clear yellow solution at the end of this time. Excess acetic anhydride and pyridine (3 parts to one by weight) were added, causing a darkening of the solution. After stirring for one and one-half hours at about room temperature, the reaction mixture was poured over excess solid sodium bicarbonate, water was added, and the mixture was stirred for 16 hours. The organic portion was then extracted with methylene chloride, dried over magnesium sulfate, and freed of solvent under reduced pressure. The residual dark syrup crystallized on standing and was identified by elemental analysis and infrared examination as the desired product, 4-acetamido-2-bromo-1-butylimidazole. Yield—1.5 g., melting point (recrystallized) 135–7° C.

Example 4

4.72 g. of phenylcyanamide in a solution containing 4 g. of triethylamine was reacted with 7.2 g. of chloro o-methoxyphenylacetonitrile dissolved in dimethylformamide solution. Heat was evolved and the mixture changed color from pale yellow to orange. A precipitate began to appear within three minutes after the addition. The flask was cooled and the product removed, filtered, washed and dried. The recrystallized α-(o-methoxyphenyl)-N-cyano-N-phenylglycinonitrile produced melted at 64–65° C. and amounted to 8.9 g., a yield of 84% of the theoretical.

Example 5

Anhydrous hydrogen bromide was bubbled for one and one-half hours into a cooled methylene chloride solution of 2.6 g. of the nitrile product of Example 4, the reaction mixture remaining a clear yellow solution. Methylene chloride and excess HBr were removed from the mixture under reduced pressure and excess aqueous sodium bicarbonate was added to the remaiining crystalline mass. After standing one hour at room temperature, the mixture was filtered to remove the product which was air dried. The yield was 2.8 g. The crystalline product, 4-amino-2-bromo-5-(o-methoxyphenyl)-1-phenylimidazole melted at 187–192° C. with some decomposition.

Example 6

5.9 g. of phenylcyanamide and 5.05 g. of triethylamine in dimethylformamide solution were slowly combined with a dimethylformamide solution of 16 g. of o-chloromandelonitrile p-toluenesulfonate. The reaction mixture was stirred for four hours, cooled and the product separated out. A yield of 10 g. of crystalline α-(o-chlorophenyl)-N-cyano-N-phenylglycinonitrile melting at 107–8° C. was obtained.

Example 7

Anhydrous HBr was bubbled into a cooled solution of 2 g. of the product of Example 6 in a solvent composed of one volume of methylene chloride and five volumes of ether. A white precipitate appeared at the start but later dissolved and after two hours, the reaction mixture was a clear yellow solution. The solvents and excess HBr were removed under reduced pressure and excess acetic anhydride-pyridine solution (3 parts to 1 by weight) was added to the residual yellow syrup, causing evolution of considerable heat of reaction. After this solution had stood in an ice bath for one hour, it was poured into 20% aqueous sodium acetate. A product slowly crystallized out of solution. The aqueous layer was extracted once with methylene chloride and the product thereby obtained was combined with the crystalline material. Total yield of 4-acetamide-2-bromo-5-(o-chlorophenyl)-1-phenylimidazole was 1.6 g. Recrystallization from methylene chloride yielded white crystals melting at 219–220° C.

Example 8

To an ethanolic solution of 1.3 of 4-acetamido-2-bromo-1-benzylamidazole was added 0.36 g. of sodium acetate and 90 mg. of 10% palladium on charcoal. Hydrogenation was accomplished at room temperature and atmospheric pressure. The actual uptake of hydrogen was 120 ml. with theoretical being 109 ml. The total reaction time was two hours. At the end of this time, the catalyst was removed by filtration and the solvent removed in vacuo. The product was extracted from the residue with methylene chloride. The methylene chloride extract was dried over magnesium sulfate and removed in vacuo. The weight of the resultant solid, 4-acetamido-1-benzylimidazole, was 0.95 g. It had a melting point of 180–181° C.

By the general procedures described in the above examples, other imidazoles of this class were prepared and identified. These included 4-acetamido-2-bromo-1-methylimidazole obtained as white needles melting at about 223° C.; 4-acetamido-2-bromo-1-ethylimidazole, pale yellow crystals with a melting point of 175–6° C.; 4-amino-2-bromo-1,5-diphenylimidazole, a yellow powder melting at 195–210° C.; 4-amino-2-bromo-5-(3,5-dichlorophenyl)-1-phenylamidazole, white prisms melting at 154–6° C. and 4-acetamido-2-bromo-1-benzylimidazole.

By the same general procedure shown in the above examples, the analogous 2-chloro and 2-iodoimidazoles are prepared, either as the 4-amino compounds or as the acetyl or benzoyl derivatives of these.

These imidazoles in general are white to yellow crystals with relatively high melting points, insoluble in water and soluble in alcohol and acetone. They are active preemergent herbicides when applied by conventional methods to the seeds of such plants as crabgrass, wild oats, and peas. The aromatic derivatives in particular show insecticidal activity when used as the active component in sprays or dusts on spider mites and cockroaches.

The aryl substituted N-cyano-glycinonitriles are biologically active. They are also active preemergent herbicides when applied to the seeds of such plants as beans, waterplant-moneywort, waterplant-salvenia, and waterplant-milfoil. They have also shown activity as fish repellants, and more particularly against carp. They have also shown activity as cockroach repellants and against plum curculio.

Although the invention has been illustrated by specific examples, it is to be understood that it includes all modifications and variations that come within the scope of the appended claims.

What is claimed is:
1. A process comprising reacting

(1) an alkyl cyanide having a substituent on the alpha carbon selected from the group consisting of halides, an acyl radical having the formula

and a sulfonyl radical having the formula —O—SO$_2$M, wherein M is a hydrocarbon radical, with a hydrocarbon substituted cyanamide in an anhydrous amide solvent to form a N-cyano-glycinonitrile, and recovering said N-cyano-glycinonitrile; and (2) reacting said N-cyano-glycinonitrile with at least two molar equivalents of an anhydrous halogen halide to form the hydrohalide salt of the 2-halo-4-amidoimidazole.

2. A process for preparing a 2-bromo-4-aminoimidazole comprising reacting a N-cyano-glycinonitrile with at least two molar equivalents of anhydrous hydrogen bromide, in a non-polar solvent, at a temperature between 0° and 50° C. to form the hydrogen bromide salt of the 2-bromo-4-aminoimidazole.

3. The process of claim 2 wherein an excess of 2 moles of hydrogen bromide is utilized and the reactions are caused to take place at ambient temperatures.

4. A process for preparing a 2-halo-4-aminoimidazole comprising reacting N-cyano-glycinonitrile with at least two molar equivalents of an anhydrous hydrogen halide, in a non-polar solvent, at a temperature between 0° and 50° C., to form the hydrogen halide salt of the 2-halo-4-aminoimidazole.

5. The process of claim 4 wherein the reaction takes place at ambient temperatures.

6. A substituted 2-halo-4-aminoimidazole having the formula

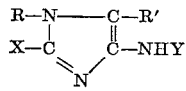

wherein R and R' are each selected from the group consisting of hydrogen, lower alkyl, monocyclic cycloalkyl of 5 to 6 carbon atoms, and monocyclic aryl, Y is selected from the group consisting of hydrogen, lower alkanoyl of 2 to 4 carbon atoms and benzoyl, and X is selected from the group consisting of chlorine, bromine and iodine.

7. The compound of claim 6 wherein X is bromine.

8. A substituted hydrogen halide salt of a 2-halo-4-aminoimidazole having the formula

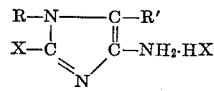

wherein R and R' are each selected from the group consisting of hydrogen, lower alkyl, monocyclic cycloalkyl of 5 to 6 carbon atoms, and monocyclic aryl, and X is selected from the group consisting of chlorine, bromine and iodine.

9. 4-acetamido-2-bromo-1-phenylimidazole.
10. 4 - acetamido - 2 - bromo - 5 - (o-chlorophenyl) imidazole.
11. 4 - amino - 2 - bromo - 5 - (o-methoxyphenyl) imidazole.
12. 4 - amino - 2 - bromo - 5 - (3,5 - dichlorophenyl) imidazole.
13. 4-amino-2-bromo-1,5-diphenylimidazole.
14. 4-acetamido-2-bromo-1-methylimidazole.
15. 4-acetamido-2-bromo-1-ethylimidazole.
16. 4-acetamido-2-bromo-1-butylimidazole.
17. 4-acetamido-2-bromo-1-benzylimidazole.

References Cited by the Examiner
UNITED STATES PATENTS

| | | | |
|---|---|---|---|
| 2,268,108 | 12/1941 | Collie et al. | 260—465 |
| 2,376,424 | 5/1945 | Fell | 260—309 |
| 2,401,522 | 6/1946 | Stoll et al. | 260—309 |
| 2,666,079 | 1/1954 | Harman | 260—465 |
| 2,743,291 | 4/1956 | De Benneville | 260—465.5 |
| 2,762,837 | 9/1956 | Middleton | 260—465 |
| 2,809,983 | 10/1957 | Heininger | 260—465 |
| 2,819,197 | 1/1958 | Santmyer et al. | 260—465 |
| 2,927,126 | 3/1960 | Pursglove | 260—465 |
| 2,946,803 | 7/1960 | Zaugg et al. | 260—309 |
| 2,957,885 | 10/1960 | Bortnick et al. | 260—309 |

OTHER REFERENCES

Cook et al., Jour. Chem. Soc., 1948, pages 1262–63.

Noller Chemistry of Organic Compounds, 2nd Ed., pages 161 and 244, Philadelphia, Saunders, 1958.

Sarasin et al., Helv. Chim. Acta, vol. 7, page 716 (1924).

Weidenhagen et al., Berichte, vol. 68, pages 2205–9 (1935).

WALTER A. MODANCE, *Primary Examiner.*

IRVING MARCUS, *Examiner.*

NATALIE TROUSOF, *Assistant Examiner.*